United States Patent
Stoner et al.

(10) Patent No.: US 8,392,356 B2
(45) Date of Patent: Mar. 5, 2013

(54) EFFICIENT TRANSFORMATION OF INFORMATION BETWEEN A SOURCE SCHEMA AND A TARGET SCHEMA

(75) Inventors: Mike Stoner, San Francisco, CA (US); Neal Cruz, Emeryville, CA (US)

(73) Assignee: TIBCO Software Inc., Palo Alto, CA (US)

( * ) Notice: Subject to any disclaimer, the term of this patent is extended or adjusted under 35 U.S.C. 154(b) by 431 days.

(21) Appl. No.: 11/734,105

(22) Filed: Apr. 11, 2007

(65) Prior Publication Data

US 2007/0179988 A1 Aug. 2, 2007

Related U.S. Application Data

(62) Division of application No. 10/611,232, filed on Jun. 30, 2003, now Pat. No. 7,225,411.

(51) Int. Cl.
*G06F 7/02* (2006.01)
*G06F 17/14* (2006.01)
*G06F 17/30* (2006.01)

(52) U.S. Cl. ......... 707/602; 707/756; 707/809; 707/810

(58) Field of Classification Search ............. 707/2, 102, 707/100, 999.002, 999.1, 999.102, 602, 756, 707/809, 810, 103 R, 104.1, 999.103, 999.107, 707/803, 999.003
See application file for complete search history.

(56) References Cited

U.S. PATENT DOCUMENTS

| | | | |
|---|---|---|---|
| 6,336,124 B1 * | 1/2002 | Alam et al. | 715/205 |
| 6,678,691 B1 * | 1/2004 | Kikkers | 707/602 |
| 7,340,728 B2 | 3/2008 | Kutter | |
| 7,373,349 B2 * | 5/2008 | O'Brien et al. | 707/791 |
| 2002/0111965 A1 * | 8/2002 | Kutter | 707/513 |
| 2004/0044987 A1 * | 3/2004 | Kompalli et al. | 717/100 |
| 2004/0225763 A1 * | 11/2004 | Carroll et al. | 710/36 |
| 2005/0021513 A1 * | 1/2005 | Vedula et al. | 707/3 |
| 2008/0126402 A1 * | 5/2008 | Sikchi et al. | 707/102 |
| 2008/0222510 A1 * | 9/2008 | Nguyen et al. | 715/212 |

OTHER PUBLICATIONS

"XSL Transformations," edit version dated Jun. 27, 2003, retrieved from http://en.wikipedia.org/w/index.php?title=XSL_Transformations&oldid=1113143 on Apr. 13, 2009.*
W3C, "XSL Transformations (XSLT)", Version 1.0, W3C Recommendation, Nov. 16, 1999, pp. 1-73, http://www.w3.org/TR/1999/REC-xslt-19991116.

* cited by examiner

*Primary Examiner* — Bruce Moser
(74) *Attorney, Agent, or Firm* — Baker & McKenzie LLP

(57) ABSTRACT

A method is described for relaying information from a first body of information defined by a source schema to a second body of information defined by a target schema. The method involves mapping content associated with one or more source schema fields from the first body of information to a third body of information defined by an intermediate schema. The method further involves executing one or more transformation functions that use the content and are identified by the intermediate schema. The method further involves mapping one or more results of the executing from the third body of information to the second body of information.

36 Claims, 6 Drawing Sheets

EFFICIENT TRANSFORMATION OF INFORMATION BETWEEN A SOURCE SCHEMA AND A TARGET SCHEMA

RELATED APPLICATION AND PRIORITY CLAIM

This application is a Divisional Application of U.S. patent application Ser. No. 10/611,232 entitled "Efficient Transformation of Information Between a Source Schema and a Target Schema," filed Jun. 30, 2003, which is herein incorporated by reference in its entirety for all purposes.

FIELD OF INVENTION

The field of art relates generally to software; and, more specifically, to efficient transformation of information between a source schema and a target schema.

BACKGROUND

Software upon which corporations or other large institutions depend so that their business or other transactional "flows" may be performed in an automated fashion often refer to "schemas". A schema defines the organization and/or structure of a body of information. For example, a schema may be used to define the organization and/or structure of a database, a message or a document in terms of specific fields that are entertained by the database, message or document; and, specific relationships that exist amongst the fields. For example, FIG. 1 shows an exemplary schema 101 for a database, message or document that keeps track of the purchase orders placed by "Customer_X". The schema 101 includes a goods field 102 that keeps track of goods purchased by Customer_X, a services field 106 that keeps track of services purchased by Customer_X and a Date/Time field 107 that keeps track of the precise date and time that any goods or services are purchased by Customer_X.

The exemplary schema 101 of FIG. 1 also illustrates additional definitional matter that corresponds to further refinement of the goods field 102. In particular, the additional definitional matter includes a Part Number (P/N) field 103 which is further defined by a Quantity (QTY) field 104 and a Dollars Per Unit ($/ea.) field 105. For the sake of example, the P/N field 103 may be assumed to at least include an entry for a specific part number that Customer_X might order at any time (e.g., part number "42F1476" which is used to track a specific widget model). The QTY field is used to track the number of units for that specific part number ordered by Customer_X (e.g., how many units of the "42F1476" widget has Customer_X ordered). The $/ea. field is used to track the specific price that Customer_X has agreed to pay for the ordered units of the specific part number (e.g., the price per unit of the "42F1476" widget at the quantity ordered).

Note that the interconnections between fields 102-105 suggest some form of relationship in the sense that the P/N describes a type of good; and, the QTY and $/ea. fields 104, 105 are used to track the quantities and purchase price for the specific type of good having part number "P/N". Significantly more complex definition would be expected in a typical implementation (e.g., where thousands of different part numbers and services are tracked). As a basic example of an automated inter-business flow, Customer_X may execute software that automatically orders specific part numbers in specific quantities at specific prices. Here, for a specific order made by Customer_X of widgets having the part number tracked by the P/N field 103, the QTY field 104 and the $/ea. field 105 would be used to record the quantity ordered and the price per unit for the specific purchase. By so tracking this information, a supplier that executes software that includes schema 101 can automatically track the orders placed by Customer_X for the specific part number "P/N".

The supplier may moreover be retrofitted with sophisticated intra-business software that causes the supplier to automatically perform internal software based transactions/flows as a consequence of an order made by Customer_X. For example, the order made by Customer_X may cause the supplier's intra-business software to trigger notification to the supplier's warehouse that a QTY of P/N should be sent to Customer_X. Further still, referring to FIG. 2, the order made by Customer_X that is recorded in schema 101 may be used to update another schema 201 that is used by the supplier to automatically generate invoices for Customer_X. Note that schema 201 is a different schema than schema 101 because different fields and/or relationships are observed (e.g., the invoice schema 201 includes a "sub-total" field 206 that is not tracked by the orders schema 101; the backbone of the invoice schema's 201 organization is the date and time field 202, etc.).

Nevertheless, there is a great deal of overlap with respect to the informational content of the two schema 101, 201. That is, like the order schema 101, the invoice schema 201 includes: 1) a date and time field 202 for a particular order; 2) a P/N field that identifies the specific P/N ordered; 3) a QTY field 204 that identifies the amount ordered; and, 4) a $/ea. field 205 that identifies the price for the amount ordered. Here the informational overlap between the two schema 101, 201 reflects the fact that much of the same information used to define an order can also be used to generate an invoice (i.e., date and time, part number, quantity, and price).

A well-known technique in the automated business software arts, referred to as "mapping", is used to transfer information from a "source" schema to a "target" schema. To be more precise, when diagrammed for the purposes of understanding the information flow(s) at play, mapping is viewed as the transfer of information from a source schema to a target schema. However, in actual implementation (e.g., during the actual operation of an automated business software program), mapping involves the transfer of information from a first body of information defined by a first schema (e.g., a "source" schema) to a second body of information defined by a second schema (e.g., a "target" schema). For convenience, the present Background discussion and the following Detailed Description discussion largely refer to the diagramming perspective where mapping is viewed as a transfer of information from a source schema to a target schema.

Mapping is often used to ensure that various schemas having informational content overlap are kept abreast of changes or updates to the overlapping information. The situational example of FIG. 2 represents a good example of the usefulness of mapping. Here, by mapping the date and time, part number, quantity and price fields from the "source" order schema 101 to the "target" invoice schema 201, the software responsible for invoicing a client is automatically updated with the information necessary to generate an invoice for a new order. Note that each of the individual mappings 207, 208, 209, 210 that would be specified and executed by the supplier's automated business software is illustrated in FIG. 2. Complications may arise, however, if some form of transformation is to be made to information being mapped between schema.

FIG. 3 shows an example of such a transformation by way of example. Here, assume that a purchase order is placed by a U.S. division of Customer_X and is therefore specified in U.S. dollars (as tracked by the $/ea. field 105). Nevertheless, Customer_X is a French company who expects to be invoiced in terms of French francs and not U.S. dollars. An invoicing schema 301 used to automatically generate invoices for Customer X should therefore specify purchase prices in Francs per unit (Fr./ea.) rather than U.S. dollars per unit ($/ea.); and, moreover, a transformation 312 is needed to covert a $/ea. field 105 entry from the source "order" schema 101 to a Fr./ea. field 305 entry for the "target" invoice schema 301. Note that the part number 103, 303, quantity 104, 304 and date and time 105, 302 field entries do not require transformation between the source and target schema 101, 301; and, therefore, their corresponding mappings 307, 308, 309 are "clean" or "direct" as first illustrated with respect to FIG. 2 (i.e., each mapping links a source field to a target field without transformation).

By contrast, the "mapping" used to generate the entry into the Fr./ea. field 305 is not "clean" or "direct" in that a "dollars-to-francs" transformation 312 is involved. Moreover, a "dollars-to-francs" transformation 312 is apt to be based on an exchange rate; which, in turn, is apt to be based on the specific date and time 107 of the purchase order. FIG. 3 demonstrates the additional complexity posed by the transformation 312 in the sense that the date and time field 107 entry is not only used to map "directly" to the target date and time field 302 entry but also is used as an input parameter (along with the $/ea. field 105 entry) by the dollars-to-francs transformation 312. The complications associated with transformations that occur between a target schema and a source schema (as part of relaying informational content from the source schema to the target schema) impose latency and high computational overhead in automated business flow software implementations. Moreover, these inefficiencies tend to scale with the amount of transformation processing that needs to be performed (e.g., if multiple transformations are to be performed, approximately, the latency/overhead grows by a factor of each transformation to be performed).

FIGURES

The various embodiments of the present invention are illustrated by way of example, and not by way of limitation, in the figures of the accompanying drawings and in which.

Figure 6:
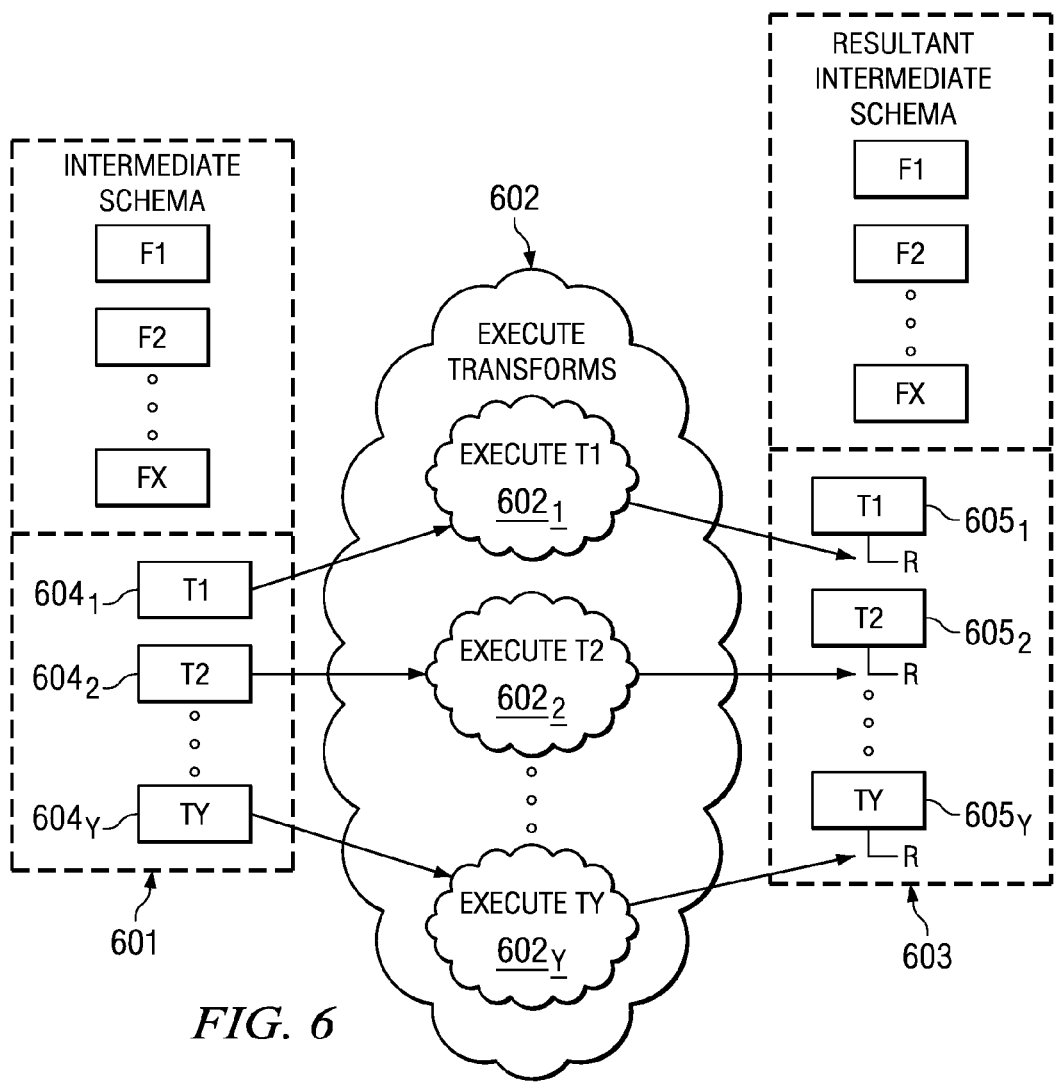
Figure 7:
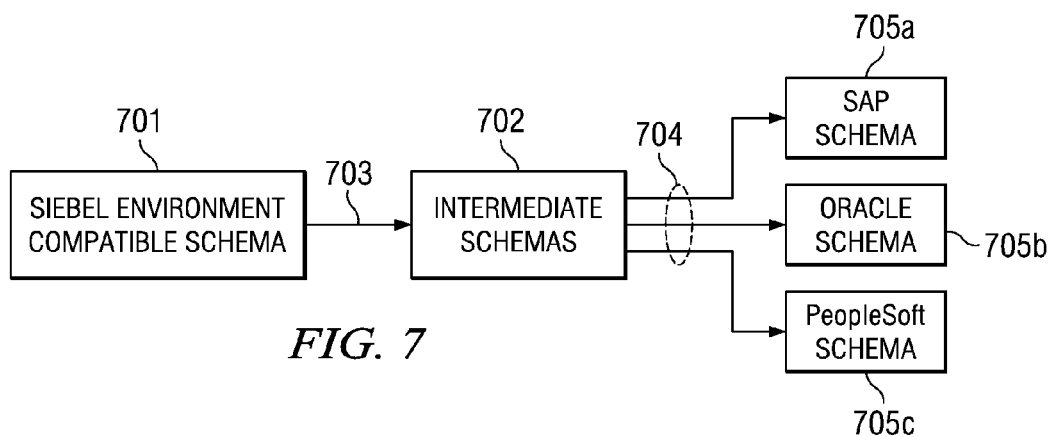
Figure 8:
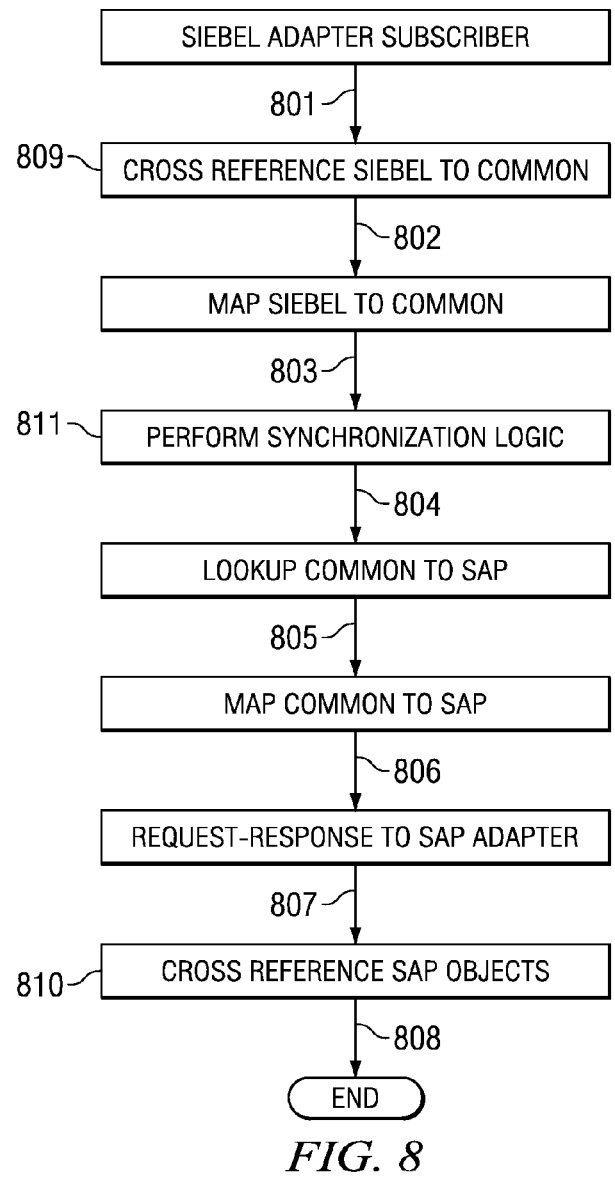
Figure 9:
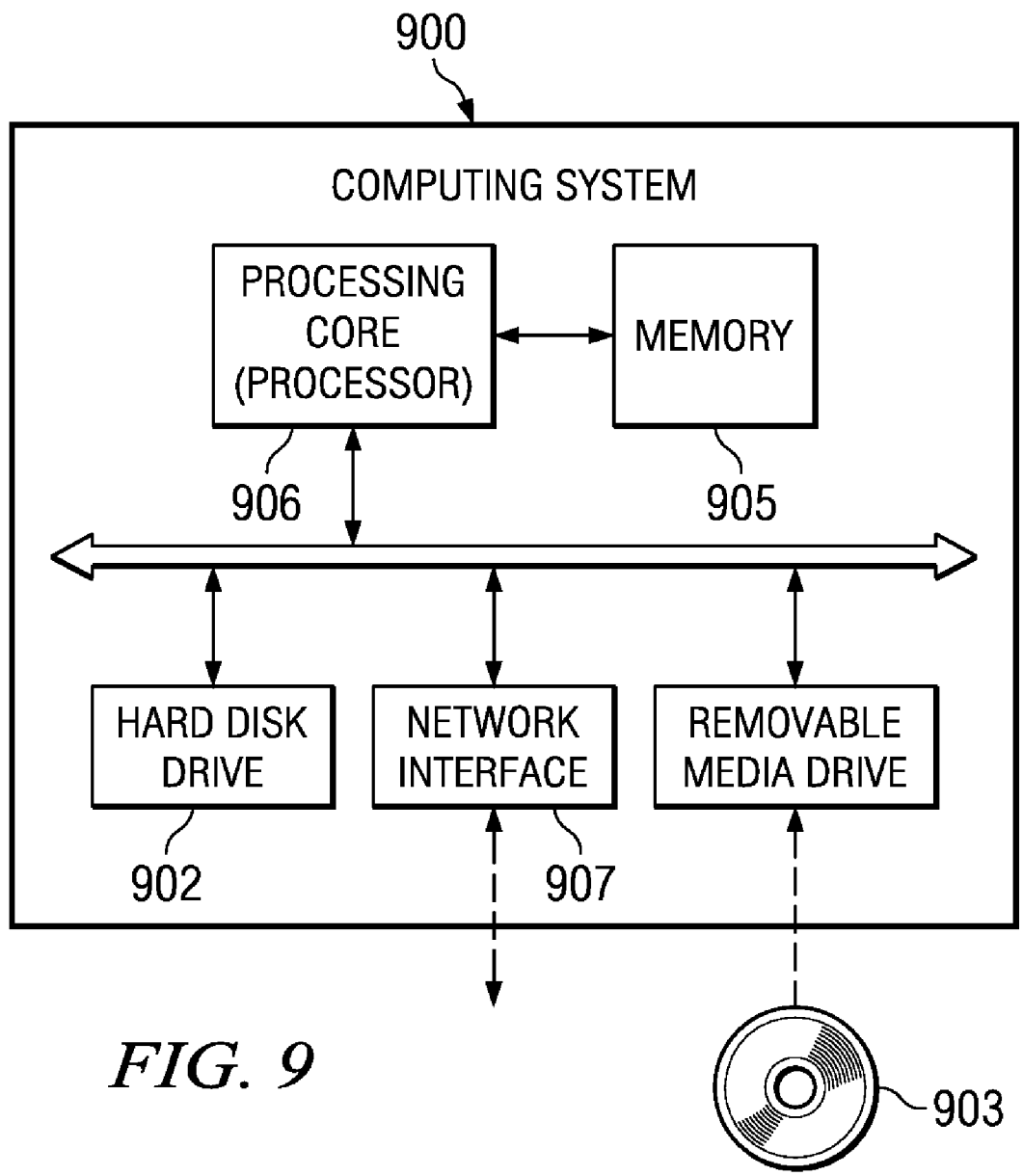

FIG. 6 indicates that multiple transformations between a source schema and a target schema can be performed in parallel;

FIG. 7 shows a technique for using intermediate schema to translate between different vendor environments;

FIG. 8 shows an exemplary data flow;

FIG. 9 shows a computing system.

DETAILED DESCRIPTION

A solution to the inefficiencies associated with performing transformations between target and source schema is to make use of an intermediate schema. As described in more detail immediately below, an intermediate schema not only allows for ease of transformation processing but also allows mapping sequences to be "direct". Each of these aspects allows for efficient transformation of information between a target schema and a source schema. FIG. 4 shows an exemplary depiction as to how the general and exemplary problem of FIG. 3 may be handled though use of an intermediate schema.

Figure 1:
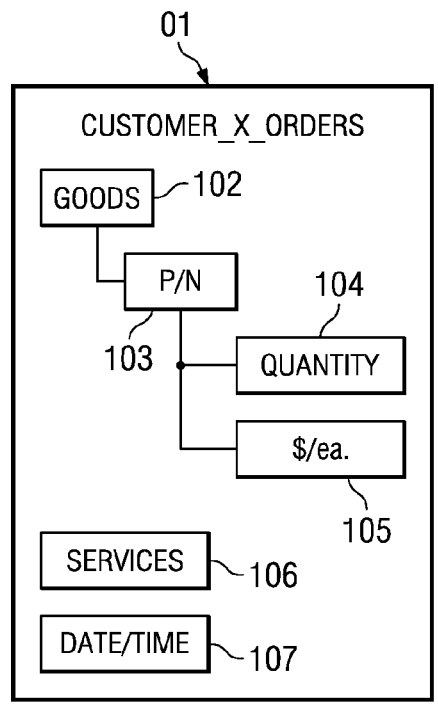
FIG. 1 shows a depiction of a schema.
Figure 2:
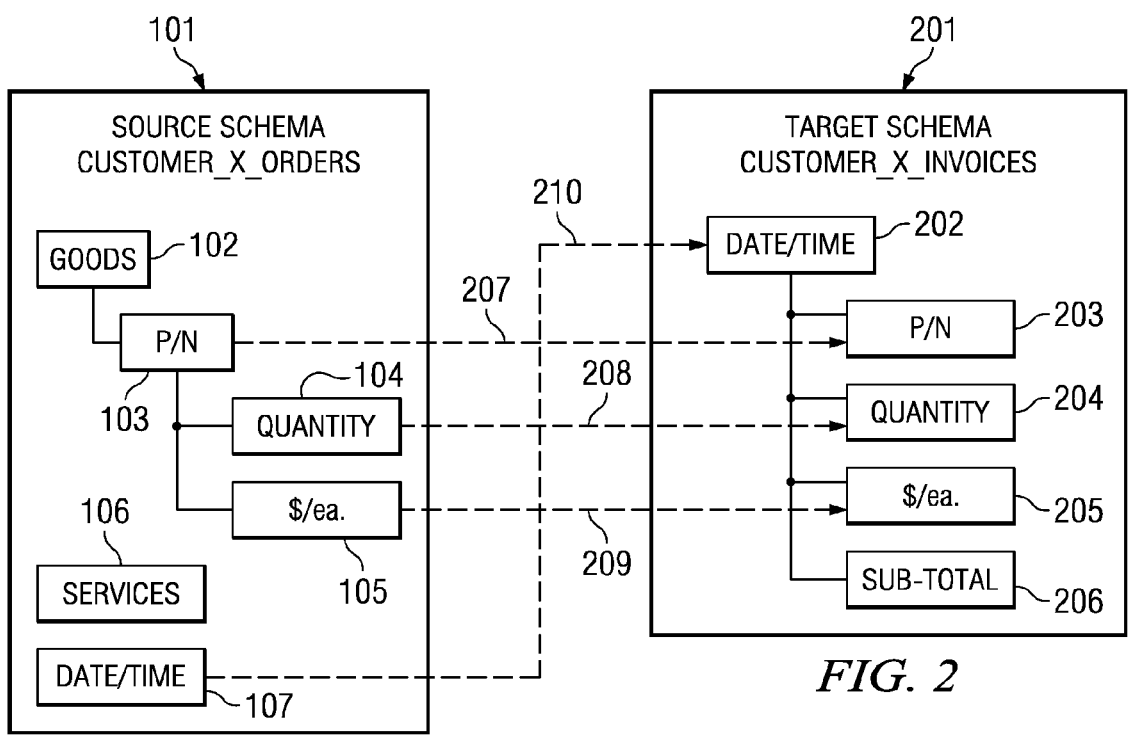
FIG. 2 shows mapping between a source schema and a target schema.
Figure 3:
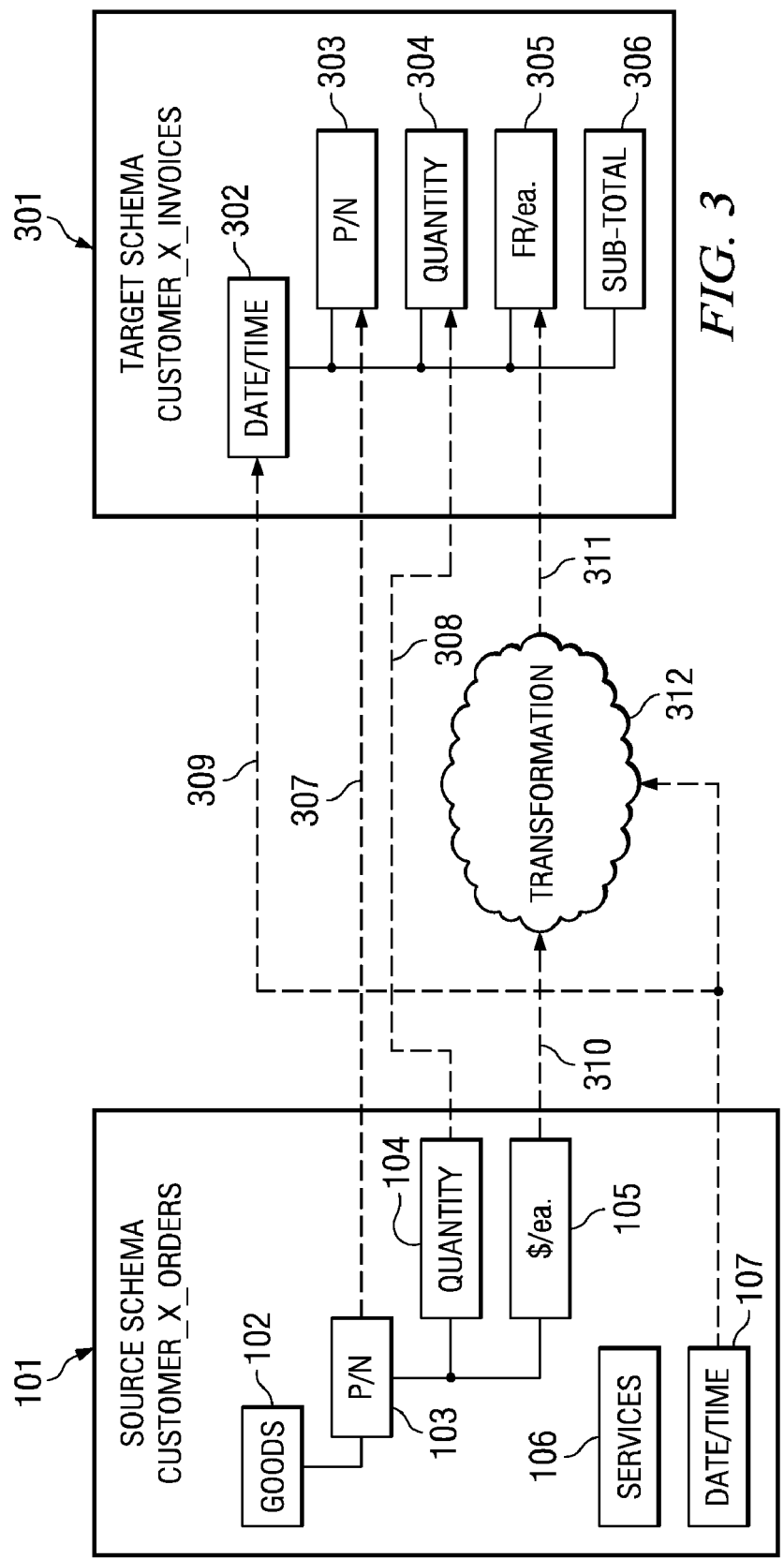
FIG. 3 shows a transformation that takes place between a source schema and a target schema.
Figure 4:
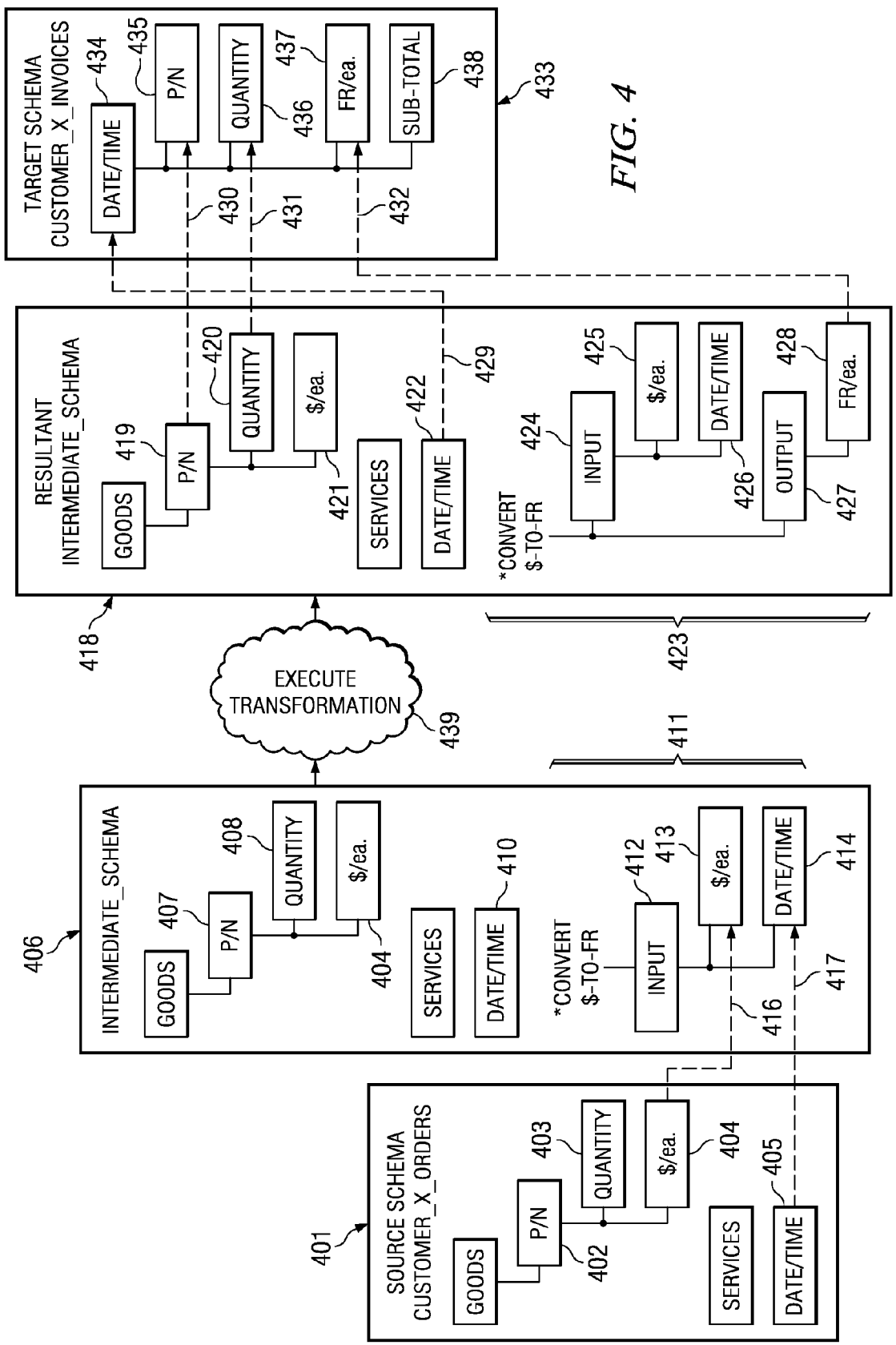
FIG. 4 shows a technique for handling a transformation between a source schema and a target schema with an intermediate schema.

Accordingly, the source schema 401 of FIG. 4 is identical to the source schema 101 of FIG. 3 and the target schema 433 of FIG. 4 is identical to the target schema 301 of FIG. 3. With an understanding as to the source schema 401, the target schema 433 and the one or more transforms to be performed—an automated business flow software tool can automatically create an intermediate schema 406. In various embodiments the intermediate schema duplicates or replicates at least a portion of its corresponding source schema. For example, that structure of one or more source schema regions containing field entries that are to be relayed to the target schema may be duplicated as part of the intermediate schema formation process. FIG. 4 shows a more extreme example where the entire source schema 401 (rather than just one or more portions of the source schema) is replicated in order to form the intermediate schema 406.

Moreover, besides the one or more portions of a source schema that are duplicated, the intermediate schema is also enhanced with reference to one or more functions (e.g., via "function calls") that corresponds to the one or more transforms to be performed. In the example of FIG. 4, the transform to be performed corresponds to a convert dollars to francs ("convert $-to-fr.") function that is responsible for performing the dollars to francs transformation on the source schema's $/ea. field 404 entry. As such, note that the intermediate schema embodiment 406 of FIG. 4 includes identical content to that observed in the source schema (i.e., goods; P/N 402, 407; QTY 403, 408; $/ea. 404, 409; services and date/time fields 405, 410) and a "convert $-to-fr." function 411 that is to perform the transformation.

Here, note that the incorporation of one or more function calls into a schema in and of itself is believed to be novel. When a function is included in the definition of a schema, the function typically refers to one or more input fields where input values are to be entered. When called upon to operate, the function performs its function using the input values as input parameters. The function call may also refer to one or more output fields where the result of the function's calculations/processes are provided. Adding a function call to a schema entails some sort of annotation to the schema as to the function call being performed and some sort of extension to the schema to hold the parameters for the function call and/or the values for the return of the function call. These parameters/values should be included in a manner that is accessible to a mapping tool so that "inputs" to the function can be mapped into the function's corresponding input field(s); and, "output results" of the function can be mapped out of the function's corresponding output field(s).

Note also that, as described in more detail below with respect to FIG. 6, multiple functions may be instantiated by a single intermediate schema. For example, if the transformation to be performed in FIG. 4 involved a transformation for multiple types of currency beyond dollars-to-francs (e.g., dollars-to-francs; dollars-to-marks; and, dollars-to-pounds); then, multiple functions would be listed in the intermediate schema. These multiple operations could then be performed in parallel allowing for a significant savings in total transformational latency. Note that such a situation involves a plurality of transforms being applied to a single "input field" value (US dollars). In various other embodiments, multiple transformations each having their own unique input field value are instantiated into an intermediate schema. Other intermediate schema embodiments may include some transformations using a same input value and some transformations having unique input value(s).

With the creation of an intermediate schema 406, in order to begin to perform the transformation process, appropriate values are mapped into the input fields 413, 414 of the intermediate schema's function 411. In the case of the example of FIG. 4, the "convert $-to-fr." function 411 requires the "$/ea." value for the purchase order at issue; and, the date and time for the purchase order at issue. As such, the function 411 is drawn as including both a "$/ea." field 413 for receiving the "$/ea." value; and, a "date and time" field 414 for receiving the "date and time" value. In order to provide these fields 413, 414 with their corresponding input values: 1) the value held within the "$/ea." field 404 of the source schema 401 is mapped 416 into the "$/ea." input field 413 for function 411; and, 2) the value held within the "date/time" field 405 of the source schema 401 is mapped 417 into the "date/time" input field 414 for function 411.

In order to effect these mappings 416, 417 the appropriate source fields 404, 405 should be marked. Note that each of these mappings correspond to basic, "clean" mappings that traditional software tools handle efficiently. However, note that less than perfectly "clean" mappings may be entertained. That is, for example, various concatenations (e.g., merging of fields, the use of sub-strings (i.e., mappings where only a few characters of a field are involved), etc.) may be entertained that causes the mapping process to be something more complicated than "one-to-one" transportation of a full field entry from a source schema to a target schema. Generally, in the spirit of implementing the mappings as they are not uncommonly used, any non egregious latency or failure prone mapping sequence or technique may be undertaken.

Once the input values for the function 411 have been mapped 416, 417 into their corresponding fields 413, 414, the transformation is executed 439 by performing the function called out by the intermediate schema. The result of the function's execution, which in this example is the purchase order price in terms of francs/unit, is provided in an output field 428 of a resultant intermediate schema 418. The resultant intermediate schema 418 includes the content of the intermediate schema 406 enhanced with the results of the executed transformation. In one embodiment, the intermediate schema 406 includes the field for the function result so that the empty result field is filled as a consequence of the function being performed. This approach is not indicated by FIG. 4 because no such result field is shown in the intermediate schema 406. In an alternate approach, the result field 428 may be created as part of the performance of the function. In the later case, which is suggested by FIG. 4, either a new, second schema having the result field 428 in its definition may be created to form the resultant schema; or, alternatively, the result field 428 may be added to the original intermediate schema 406 as part of the function execution process.

With the transformation being executed 439 and the content of the resultant intermediate schema 418 being complete, appropriate values are mapped from the resultant intermediate schema 418 into the target schema 433. In the case of the example being discussed herein: 1) the value held by the P/N field 419 of the resultant intermediate schema 418 is mapped 430 into the P/N field 435 of the target schema 433; 2) the value held by the QTY field 420 of the resultant intermediate schema 418 is mapped 431 into the QTY field 436 of the target schema 433; 3) the value held by the date/time field 422 of the resultant intermediate schema 418 is mapped 429 into the date/time field 434 of the target schema 433; and, 4) the value held by the function result field 428 (which specifies fr./ea.) of the resultant intermediate schema 418 is mapped 432 into the fr./ea. field 437 of the target schema 433.

Note that, similar to the mappings 416, 417 between the source schema 401 and the intermediate schema 406, that each of mappings 429, 430, 431, 432 correspond to basic, "clean" mappings that traditional software tools handle efficiently. Again, in actual implementation, any non egregious latency or failure prone mapping sequence/technique could be used. Recall also that, in various embodiments, intermediate schema are made to include fields whose content will be mapped into the target schema. So doing allows the complete amount of information to be mapped from the resultant intermediate schema alone into the target schema. Such a process flow is observed in FIG. 4, where the duplication of the source schema 401 which was used to create the intermediate schema 406 ultimately causes each of fields 419, 420, 422 in the resultant intermediate schema 418 to have identical content as their corresponding fields 402, 403, 405 in the source schema 401. This, in turn, enables the resultant intermediate 418 schema to have all information content needed for direct transfer into the target schema 433 via mapping sequences 429, 430, 431 and 432.

Figure 5:
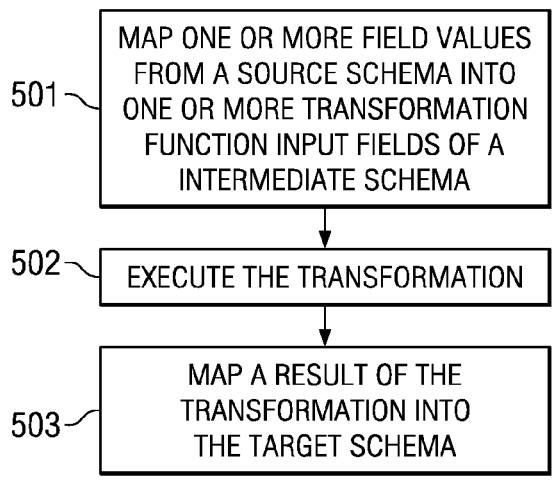
FIG. 5 shows a methodology indicated by the technique outlined by FIG. 4.

FIG. 5 shows an embodiment of a methodology that has been described by the description provided just above. First, one or more field values from a source schema are mapped 501 (e.g., mappings 416, 417 of FIG. 4) into one or more transformation input fields of an intermediate schema. Then, the transformation is executed 502 (e.g., transformation execution 439 of FIG. 4). Then, a result of the transformation is mapped 503 (e.g., mapping 432 of FIG. 4) into the target schema 503. Again, multiple functions may be defined per intermediate schema so as to allow multiple transformations to be performed per information flow between source and target schema. FIG. 6 elaborates on this aspect in more detail.

FIG. 6 illustrates not only that multiple transformations may be associated with a relaying of information content from a source schema to a target schema but also that such multiple transformations may be performed in parallel. By performing multiple transformations in parallel rather than in series, substantial time savings should be realized. FIG. 6 only indicates the intermediate schema 601, the execution of multiple transformations in parallel 602; and, the resultant intermediate schema 603. The intermediate schema 601 includes fields (F1 through FX) from the source schema as well as references to multiple functions $604_1$ through $604_Y$ that correspond; in turn, to multiple transformations. As a simple example of multiple transformations between source and target schema that corresponds to an enhancement of the examples discussed above with respect to FIGS. 3 and 4, consider a situation in which English and German offices of Customer_X are to be "cc'd" on all invoices.

In this case, three different transformations are required: 1) U.S. dollars to French francs; 2) U.S. dollars to German marks; and, 3) U.S. dollars to English pounds. In FIG. 6, each function $604_1$ through $604_Y$ listed in the intermediate schema 601 can be viewed as corresponding to a different transformation that is to be performed between the source and intermediate schemas. Here, note that: 1) the first transformation T1 is executed on its own associated computational resource $602_1$, (e.g., a workstation, server, mainframe, storage network, etc.) having logic suitable for performing the T1 function; 2) the second transformation T2 is executed on its own associated computational resource $602_2$ (e.g., a workstation, server, mainframe, storage network, etc.) having logic suitable for performing the T2 function; . . . ; and, 3) the Yth transformation TY is executed on its own associated computational resource $602_y$ (e.g., a workstation, server, mainframe, storage network, etc.) having logic suitable for performing the TY function.

Thus in various embodiments, it is envisioned that different resources, each capable of performing a certain transformation, are invoked in parallel so that multiple transformations need not be executed in a strictly serial fashion (e.g., a second transformation cannot begin until a first transformation is completed). This may be accomplished, for example, by spreading task requests (e.g., over a network) to different data centers (and/or different computational resources in a data center) and/or different threads within a single computational resource; and then, waiting for the computing results to be returned. Note also that a separate field may be reserved in the resultant intermediate schema 603 for each resultant value to be instantiated into a target schema. FIG. 6 indicates such a structure through the representation of an "R" for each function $605_1$ through $605_Y$ in the resultant intermediate schema 603.

Performing multiple transformations allows informational relays between a source schema and a target schema to be "atomized", irrespective of whether parallel execution is performed or not. Atomization is an "all-or-nothing" implementation in which the relaying of information between a source schema and a target schema is entertained only if all transformations can be performed. Better said, if a particular transformation can not be performed for some reason, the relaying of information between the source schema and the target schema is not entertained. Here, itemizing all necessary transformation functions in the intermediate schema; and, continuing with the execution of the functions only if all of the functions can be executed allows for atomizing the relaying of information as described just above.

Before closing a few comments regarding implementation are appropriate. First, note that a transformation may involve any kind of processing or translating of data between a source schema and a target schema. Examples of such processing or translating, other than currency translation, may include (among possible others): 1) cross-referencing; 2) data-formatting; 3) time-zone normalization; 4) language translation;, etc. Note also that the relaying of information may be performed in an XML environment. Specifically, the source schema may correspond to an XML document whose corresponding attributes or elements are defined in XSD and are referenced in XPath. Likewise, the intermediate schema may correspond to an XML document whose corresponding attributes or elements are defined in XSD and are referenced in XPath. Here, the mapping between the source schema and the intermediate schema may be defined in XSLT. Finally, the resultant intermediate and target schemas may correspond to XML documents whose corresponding attributes or elements are defined in XSD and are referenced in XPath.

Moreover, relaying of information between source schema and target schema with intermediate schema may also be used to translate between different application types (e.g., applications offered by different software vendors such as SAP or Siebel). For example, SAP and Siebel based applications may both be used to track orders from Customer_X; however, perhaps owing to differences in the standard uses of such applications, their corresponding "Customer_X_orders" schema are different. Here, an intermediate schema could be used to effectively translate between a Siebel source schema and an SAP target schema (or contra-wise, between an SAP source schema and a Siebel target schema).

In another approach, the intermediate schema may be viewed as a form of "common data model" that serves a translation tool between schemas (e.g., as discussed just above, as specified by different vendor formats). FIG. 7 shows an example. According to FIG. 7, the source schema 701 is tailored within a Siebel environment. The intermediate schemas 702 and their corresponding transformation(s) convert values defined in the Siebel source document (and that are mapped 703 into the intermediate schema) into values that can be mapped 704 from the resultant intermediate schema into the target schema 705 of another vendor type (e.g., SAP, Oracle, PeopleSoft). Multiple functions may be used to simultaneously translate the Siebel schema 701 into each of: 1) an SAP schema 705$a$; 2) an Oracle schema 705$b$; and, 3) a PeopleSoft schema 705$c$). A derivative of the approach described just above is to use an intermediate schema to map between a source application 701 and a common data model; and/or to use an intermediate schema to map between a common data model and a target application 705.

The relaying of information between source schema and target schema with intermediate schema may also be incorporated into a custom data flow constructed as a chain of source and target schema; where, at least some of the processing of the data flow is instrumented as a transformation using intermediate schema. For example, referring to FIG. 8, an exemplary data flow is observed having eight mappings (represented by arrows 801-808). Here, any of the cross-referencing procedures 809, 810 and/or the synchronization logic procedures 811 could be implemented with transformations instantiated by intermediate schema.

Lastly, note that the use of an intermediate schema could be automatically embedded into the operational functions used by a software tool transparently (or not transparently if desired) to a user of the tool. For example, in typical environments, a user of the tool specifies the transfer of information to take place between a source schema and a target schema through a GUI where: 1) a representation of the source schema is capable of being displayed; 2) a representation of the target schema is capable of being displayed; and, 3) a representation of the transformation(s) to be performed as part of the information transfer between the source and target schemas. Here, from the description of the information transfer entered through the GUI, the underlying software beneath the GUI may be configured to intelligently craft the intermediate schema and the specific, appropriate mappings to affect the transfer.

FIG. 9 shows an embodiment of a computing system 900 that can execute instructions residing on a machine readable medium (noting that other (e.g., more elaborate) computing system embodiments are possible). In one embodiment, the machine readable medium may be a fixed medium such as a hard disk drive 902. In other embodiments, the machine readable medium may be movable such as a CD ROM 903, a compact disc, a magnetic tape, etc. The instructions (or portions thereof) that are stored on the machine readable medium are loaded into memory (e.g.,a Random Access Memory (RAM)) 905; and, the processing core 906 then executes the instructions. The instructions may also be received through a network interface 907 prior to their being loaded into memory 905.

Thus, it is also to be understood that embodiments of this invention may be used as or to support a software program executed upon some form of processing core (such as the Central Processing Unit (CPU) of a computer) or otherwise implemented or realized upon or within a machine readable medium. A machine readable medium includes any mechanism for storing or transmitting information in a form readable by a machine (e.g., a computer). For example, a machine readable medium includes read only memory (ROM); random access memory (RAM); magnetic disk storage media;

optical storage media; flash memory devices; electrical, optical, acoustical or other form of propagated signals (e.g., carrier waves, infrared signals, digital signals, etc.); etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method for relaying information from a first body of information to form a second body of information, the first body of information being defined by a source schema and the second body of information being defined by a target schema, the method comprising:

performing a first mapping comprising mapping content associated with a plurality of source schema fields from said first body of information to form a third body of information, the third body of information being defined by an intermediate schema, wherein the intermediate schema comprises a transformation function, an input field, a result field, and a plurality of other intermediate schema fields, wherein the input field is associated with mapped content from one of the source schema fields and used by the transformation function, wherein the result field is associated with content produced by the transformation function and mapped to a target schema field, and wherein the plurality of other intermediate schema fields are associated with content mapped by the first mapping that is mapped to a plurality of target schema fields;

executing the transformation function using the mapped content associated with the input field to produce a result, wherein the result is associated with the result field of the intermediate schema; and performing a second mapping comprising mapping content associated with a plurality of intermediate schema fields, including the result field and the other intermediate schema fields, from said third body of information to form said second body of information.

2. The method of claim 1 wherein said relaying information further comprises executing multiple transformation functions in the intermediate schema, wherein the intermediate schema comprises multiple result fields, wherein each of the result fields is associated with each of the transformation functions.

3. The method of claim 2 wherein at least a portion of said multiple transformation functions are executed in parallel.

4. The method of claim 2 further comprising conditioning execution of said functions on whether all said functions can be executed.

5. The method of claim 1 wherein at least said source schema is XML compatible.

6. The method of claim 5 wherein at least one field is defined in XSD and is referenced in XPath, and wherein said mapping content associated with at least one field is defined in XSLT.

7. The method of claim 1 wherein said relaying is part of a data flow.

8. The method of claim 1 wherein said source schema is of a first vendor type and said target schema is of a second vendor type.

9. The method of claim 1 further comprising describing said relaying of information through a user interface or through an interface to a software tool.

10. A method for relaying information from a first body of information to form a second body of information, the first body of information being defined by an XML source schema and the second body of information being defined by an XML target schema, the method comprising:

performing a first mapping comprising mapping content associated with a plurality of XML source schema fields from said first body of information to form a third body of information, the third body of information being defined by an XML intermediate schema, said mapping defined in XSLT, wherein the XML intermediate schema comprises a transformation function, an input field, a result field, and a plurality of other intermediate schema fields, wherein the input field is associated with mapped content from one of the XML source schema fields and used by the transformation function, wherein the result field is associated with content produced by the transformation function and mapped to an XML target schema field, and wherein the plurality of other intermediate schema fields are associated with content mapped by the first mapping that is mapped to a plurality of XML target schema fields;

executing the transformation function using the mapped content associated with the input field to produce a result, wherein the result is associated with the result field of the XML intermediate schema; and performing a second mapping comprising mapping content associated with a plurality of XML intermediate schema fields, including the result field and the other intermediate schema fields, from said third body of information to said second body of information.

11. The method of claim 10 wherein said relaying information further comprises executing multiple transformation functions in the XML intermediate schema, wherein the XML intermediate schema comprises multiple result fields, wherein each of the result fields is associated with each of the transformation functions.

12. The method of claim 11 wherein at least a portion of said multiple transformation functions are executed in parallel.

13. The method of claim 11 further comprising conditioning execution of said functions on whether all said functions can be executed.

14. The method of claim 10 wherein said relaying is part of a data flow.

15. The method of claim 10 wherein said XML source schema is of a first vendor type and said XML target schema is of a second vendor type.

16. The method of claim 10 further comprising describing said relaying of information through a user interface or through an interface to a software tool.

17. The method of claim 10 wherein said first body of information corresponds to a document.

18. The method of claim 10 wherein at least one field is defined in XSD and is referenced in XPath.

19. Non-transitory machine readable storage medium having instructions which when executed by at least one processor causes said at least one processor to perform a method for relaying information from a first body of information to form a second body of information, the first body of information being defined by a source schema and the second body of information being defined by a target schema, said method comprising:

performing a first mapping comprising mapping content associated with a plurality of source schema fields from said first body of information to form a third body of information, the third body of information being defined by an intermediate schema, wherein the intermediate schema comprises a transformation function, an input field, a result field, and a plurality of other intermediate schema fields, wherein the input field is associated with mapped content from one of the source schema fields and used by the transformation function, wherein the result field is associated with content produced by the transformation function and mapped to a target schema field, and wherein the plurality of other intermediate schema fields are associated with content mapped by the first mapping that is mapped to a plurality of target schema fields;

executing the transformation function using the mapped content associated with the input field to produce a result, wherein the result is associated with the result field of the intermediate schema; and performing a second mapping comprising mapping content associated with a plurality of intermediate schema fields, including the result field and the other intermediate schema fields, from said third body of information to form said second body of information.

20. The non-transitory machine readable storage medium of claim 19 wherein said relaying information further comprises executing transformation functions in the intermediate schema, wherein the intermediate schema comprises multiple result fields, wherein each of the result fields is associated with each of the transformation functions.

21. The non-transitory machine readable storage medium of claim 20 wherein at least a portion of said multiple transformation functions are executed in parallel.

22. The non-transitory machine readable storage medium of claim 20 further comprising conditioning execution of said functions on whether all said functions can be executed.

23. The non-transitory machine readable storage medium of claim 19 wherein at least said source schema is XML compatible.

24. The non-transitory machine readable storage medium of claim 23 wherein at least one field is defined in XSD and is referenced in XPath, and wherein said mapping content associated with at least one field is defined in XSLT.

25. The non-transitory machine readable storage medium of claim 19 wherein said relaying is part of a data flow.

26. The non-transitory machine readable storage medium of claim 19 wherein said source schema is of a first vendor type and said target schema is of a second vendor type.

27. The non-transitory machine readable storage medium of claim 19 further comprising describing said relaying of information through a user interface or through an interface to a software tool.

28. Non-transitory machine readable storage medium having instructions which when executed by at least one processor causes said at least one processor to perform a method for relaying information from a first body of information to form a second body of information, the first body of information being defined by an XML source schema and the second body of information being defined by an XML target schema, said method comprising:

performing a first mapping comprising mapping content associated with a plurality of XML source schema fields from said first body of information to form a third body of information, the third body of information being defined by an XML intermediate schema, said mapping defined in XSLT, wherein the XML intermediate schema comprises a transformation function, an input field, a result field, and a plurality of other intermediate schema fields, wherein the input field is associated with mapped content from one of the XML source schema fields and used by the transformation function, wherein the result field is associated with content produced by the transformation function and mapped to an XML target schema field, and wherein the plurality of other intermediate schema fields are associated with content mapped by the first mapping that is mapped to a plurality of target schema fields;

executing the transformation function using the mapped content associated with the input field to produce a result, wherein the result is associated with the result field of the XML intermediate schema; and performing a second mapping comprising mapping content associated with a plurality of XML intermediate schema fields, including the result field and the other intermediate schema fields, from said third body of information to said second body of information.

29. The non-transitory machine readable storage medium of claim 28 wherein said relaying information further comprises executing multiple transformation functions in the XML intermediate schema, wherein the XML intermediate schema comprises multiple result fields, wherein each of the result fields is associated with each of the transformation functions.

30. The non-transitory machine readable storage medium of claim 29 wherein at least a portion of said multiple transformation functions are executed in parallel.

31. The non-transitory machine readable storage medium of claim 29 further comprising conditioning execution of said functions on whether all said functions can be executed.

32. The non-transitory machine readable storage medium of claim 28 wherein said relaying is part of a data flow.

33. The non-transitory machine readable storage medium of claim 28 wherein said XML source schema is of a first vendor type and said XML target schema is of a second vendor type.

34. The non-transitory machine readable storage medium of claim 28 further comprising describing said relaying of information through a user interface or through an interface to a software tool.

35. The non-transitory machine readable storage medium of claim 28 wherein said first body of information corresponds to a document.

36. The non-transitory machine readable storage medium of claim 28 wherein at least one field is defined in XSD and is referenced in XPath.

\* \* \* \* \*